(12) United States Patent
Dähler et al.

(10) Patent No.: US 8,610,441 B2
(45) Date of Patent: Dec. 17, 2013

(54) DEVICE FOR DETERMINING A THICKNESS OR THICKNESS VARIATION OF A FLAT OBJECT

(75) Inventors: Thomas Dähler, Bern (CH); Reto Schletti, Burgdorf (CH)

(73) Assignee: BEB Industrie-Elektronik AG (CH)

( * ) Notice: Subject to any disclaimer, the term of this patent is extended or adjusted under 35 U.S.C. 154(b) by 213 days.

(21) Appl. No.: 13/144,063

(22) PCT Filed: Dec. 10, 2009

(86) PCT No.: PCT/EP2009/008833
§ 371 (c)(1),
(2), (4) Date: Jul. 14, 2011

(87) PCT Pub. No.: WO2010/078908
PCT Pub. Date: Jul. 15, 2010

(65) Prior Publication Data
US 2011/0273191 A1 Nov. 10, 2011

(30) Foreign Application Priority Data
Jan. 12, 2009 (DE) .......................... 10 2009 004 688

(51) Int. Cl.
*G01L 5/04* (2006.01)
*G01B 3/00* (2006.01)
(52) U.S. Cl.
USPC ............................ 324/671; 73/159; 33/501.04
(58) Field of Classification Search
USPC ............................ 324/671; 73/159; 33/501.04
See application file for complete search history.

(56) References Cited

U.S. PATENT DOCUMENTS 4,271,699 A * 6/1981 Williamson .................... 73/159
4,729,556 A 3/1988 Fujii et al.
(Continued)

FOREIGN PATENT DOCUMENTS

DE 1774345 A1 1/1972
DE 19841432 C1 4/2000
(Continued)

OTHER PUBLICATIONS

Schletti, Apparatus for measuring thickness and thickness variations, Nov. 2006, Machine translation attached.*

(Continued)

*Primary Examiner* — Jermele M Hollington
*Assistant Examiner* — Farhana Hoque
(74) *Attorney, Agent, or Firm* — Harness, Dickey & Pierce, P.L.C.

(57) ABSTRACT

A device for determining a thickness or thickness variation of a flat object (5), in particular of a voucher, is proposed, having at least one first guide element (1), and having a plurality of second guide elements (2) arranged next to each other in a row and opposite the first guide element (1), wherein the flat object (5) can be transported between the first guide element (1) on the one side and the second guide element (2) on the other side, and having a displaceable arrangement of the second guide elements (2) relative to the first guide element (1) in order to bring about a displacement of one or more of the second guide elements (2) in the event of a thickness variation of the flat object (5) passing between the guide elements (1, 2), and having several coils (10, 11) fixed in location, wherein each second guide element is associated with at least one coil (2), and having at least one coil core (9) rigidly connected to a second guide element (2) and displaceably guided in the coil associated with the second guide element (2), wherein a deflection of a second guide element (2) brings about a deflection of the associated coil core (9), and having an analysis device (16, 17, 18, 19) to determine the influence of the position of the coil cores (9) relative to the coils (10, 11).

12 Claims, 2 Drawing Sheets

(56) References Cited

U.S. PATENT DOCUMENTS

| | | | |
|---|---|---|---|
| 4,836,528 | A | 6/1989 | Geiser |
| 5,226,239 | A | 7/1993 | Boissevain et al. |
| 5,727,692 | A | 3/1998 | Large et al. |
| 6,360,447 | B1 | 3/2002 | Foley |
| 6,711,828 | B2 | 3/2004 | McCune et al. |
| 6,782,986 | B2 | 8/2004 | Toda et al. |
| 7,131,211 | B2 | 11/2006 | Kirstine |
| 7,392,743 | B2 | 7/2008 | Kawaguchi et al. |
| 7,743,523 | B2 | 6/2010 | Schletti et al. |
| 2002/0110396 | A1 | 8/2002 | Ueoka |
| 2003/0141653 | A1 | 7/2003 | Kumamoto et al. |
| 2004/0211904 | A1 | 10/2004 | Scowen et al. |
| 2007/0057198 | A1 | 3/2007 | Wilson et al. |
| 2008/0189968 | A1 | 8/2008 | Schletti et al. |
| 2009/0001661 | A1 | 1/2009 | Klein et al. |

FOREIGN PATENT DOCUMENTS

| | | | |
|---|---|---|---|
| EP | 0080309 | A2 | 6/1983 |
| EP | 0261354 | A1 | 3/1988 |
| EP | 0344967 | * | 5/1989 |
| EP | 0344967 | A1 | 12/1989 |
| EP | 1220165 | A2 | 7/2002 |
| EP | 1720135 | A1 | 11/2006 |
| GB | 2170908 | A | 8/1986 |
| GB | 2262614 | A | 6/1993 |
| GB | 2366371 | A | 3/2002 |
| GB | 2404013 | A | 1/2005 |
| JP | 05085643 | A | 4/1993 |
| WO | WO-92/11505 | A1 | 7/1992 |
| WO | WO-2006119926 | A1 | 11/2006 |

OTHER PUBLICATIONS

English translation of the International Preliminary Report on Patentability for PCT/EP2009/008688, issued Jul. 19, 2011 for related U.S. Appl. No. 13/144,072.

English translation of the International Preliminary Report on Patentability for PCT/EP2009/008833, issued Aug. 2, 2011.

* cited by examiner

DEVICE FOR DETERMINING A THICKNESS OR THICKNESS VARIATION OF A FLAT OBJECT

CROSS-REFERENCE TO RELATED APPLICATIONS

This application is a U.S. National Stage Application of International Application No. PCT/EP2009/008833, filed Dec. 10, 2009, and published in the German language as WO/2010/078908 on Jul. 15, 2010. This application claims the benefit and priority of German Application No. 10 2009 004 688.7, filed Jan. 12, 2008. The entire disclosures of the above applications are incorporated herein by reference.

BACKGROUND

This section provides background information related to the present disclosure which is not necessarily prior art.

TECHNICAL FIELD

The invention relates to a device for determining a thickness or thickness variation of a flat object, in particular a voucher, in which device the flat object is transported by means of first and second guide elements.

DISCUSSION

Such devices are used in the processing of flat objects. Said processing includes reading, identifying, inspecting, verifying, checking, counting, sorting, transporting and/or stacking flat objects. The flat objects include in particular vouchers or documents such as bank notes, checks, stocks, papers with a security imprint, deeds, admission tickets or travel tickets, but also credit or ATM cards and/or identification or access cards. Devices for determining the thickness or thickness variation are frequently an integral part of a system consisting of several components for handling and processing flat objects. Devices for determining the thickness or thickness variation are used to identify flat objects using adhesive tape, multiple paper feeds or counterfeit objects. Because they are used to detect adhesive tape on flat objects, the devices are also identified as tape sensors. Flat objects with adhesive tape are frequently removed from circulation after they have been identified. Counterfeit objects can only be identified using the device if they differ in their thickness from the genuine objects.

The device must exhibit great sensitivity regarding the measured thickness. In addition, a measurement across the entire width of the flat object is necessary in order to detect an adhesive strip. The width of the object is measured perpendicular to the transport direction of the guide elements.

One such device is known, for example, from WO 2006119926 A1. In said device the second guide elements are mounted displaceably with respect to a first guide element. Depending on the thickness of a flat object guided between the first guide element and the second guide elements, the second guide elements are deflected. The amount of the deflection depends on the thickness of the flat object. The second guide elements are rigidly connected to electrically conductive elements. In addition, each second guide element is associated with a flat coil fixed in location, an alternating current being applied to said flat coil. Since each of the electrically conductive elements is located in the area affected by the magnetic alternating current of the associated flat coil, eddy currents are excited in the flat coil during a relative movement between conductive element and said flat coil, which affect the alternating field and thereby the impedance of the flat coil. The effect is greater the smaller the distance between flat coil and electrically conductive element and the greater the coverage. Coverage corresponds to the partial area of the flat coil area that lies opposite the conductive element. Furthermore, the effect depends on the distance between a flat coil and a conductive element. The influence of the electrically conductive elements on the magnetic alternating field of the flat coils is detected by means of an analysis device.

In the case of this known device, the disadvantage is that detection regarding the coverage and/or the gap between the flat coils and the conductive elements is complicated, prone to malfunctions and imprecise.

SUMMARY OF THE INVENTION

An aspect of the invention is to provide a device for determining thicknesses and thickness variations of flat objects that is sufficiently sensitive, is not prone to interference and damage, provides precise measurements, and is cost-effective to produce.

This object is achieved by a device possessing the features of claim 1. Each second guide element is associated with at least one permanently mounted flat coil fixed in location. Each second guide element is furthermore rigidly connected to a coil core that in turn is moveable with respect to the coils. The windings of the coils surround a cavity in which the coil core can be moved. The stationary coils and the moveable coil cores operate in accordance with the plunger coil principle. A relative movement between a coil and an associated coil core initiated by a change in thickness and a deflection of a second guide element results in a change in the inductivity of the coil. This change in inductivity is detected by means of an analysis device. The change in inductivity is a measure of the thickness of the flat object being transported through the guide elements.

Using the device in accordance with the invention, The invention preferably includes thicknesses and changes or variations in thickness of any type of flat objects, in particular vouchers such as bank notes, checks and papers bearing a security imprint, can be determined. A flat object with an adhesive strip has, at least in sections, a greater thickness than a corresponding object without an adhesive strip. If several flat objects are fed in simultaneously, the thickness of this stack is greater than the thickness of a single object. If the object in question is counterfeit, the thickness of which differs from that of a genuine object, this can also be verified. A verifiable change in inductivity takes place even with small thicknesses of an object being transported. The device in accordance with the invention reacts extremely sensitively and with great accuracy to changes in thickness.

The device has several second guide elements that can be deflected independently of each other. Thickness can thus be determined across the entire width of a flat object. The coils and coil cores associated with the second guide elements have no effect on each other so that the determination of thickness is not compromised or falsified by superposed magnetic fields.

The second guide elements are arranged in a preferred fashion in one line running perpendicular to the direction in which the flat objects are transported. Furthermore, the guide elements are preferably transport rollers.

Either a first guide element can be provided that extends across the entire width of the second guide elements arranged next to each other, or several first guide elements can be arranged next to each other, each forming a pair with a second guide element. The series of pairs preferably runs perpendicular to the direction in which the flat objects are transported. In addition, several first guide elements can be provided, wherein a first guide element is associated with two or more second guide elements.

The device uses inexpensive components and is consequently simple and economical to produce. There is no need for additional or special sensors.

In accordance with an advantageous embodiment of the invention, the coils are arranged on a printed circuit board. Preferably the windings of the coils configured as conductors are printed on a printed circuit board. Said coils are flat coils. All the coils of the device can be located on one or on a plurality of printed circuit boards. Each coil may consist of a plurality of partial coils. Said partial coils can be located on the front and/or the back side of the printed circuit board.

In accordance with a further advantageous embodiment of the invention, each second guide element is associated with two coils. In this arrangement, one of the two coils is located on the side of the printed circuit board facing toward the second guide elements and the other coil on the side of the printed circuit board facing away from the second guide elements. A change in inductivity can be verified with great sensitivity if the coil core is located with its end facing away from the second guide elements between the two coils.

In accordance with a further advantageous embodiment of the invention, the printed circuit board has openings for the coil cores in the area of the coils. An opening forms the cavity surrounded by the windings of a coil in which the coil core can be moved. The openings are larger in cross-section than the cross-section of a coil core. The coil core is preferably moveable in this opening.

In accordance with a further advantageous embodiment of the invention, the coil cores have an elongated shape. The coil cores are preferably aligned with their longitudinal axis perpendicular to the printed circuit board. They are positioned with the end facing away from the second guide elements in or at the opening of the printed circuit board in a non-deflected initial position. This initial position corresponds to a measuring range with great sensitivity.

In accordance with a further advantageous embodiment of the invention, the coil cores are made of ferrite.

In accordance with a further advantageous embodiment of the invention, the second guide elements and the coil cores are located on transmission elements. Said elements provide a rigid connection between the second guide elements and the coil cores. The transmission elements are furthermore carried moveably. Each second guide element is associated with a transmission element that can be deflected independently of the transmission elements of adjacent second guide elements.

In accordance with a further advantageous embodiment of the invention, the transfer elements are located to be rotatable. A deflection of a second guide element thus results in a rotary motion of the associated transmission element. With small rotational angles and a distance between the axis of rotation and the coil core that is greater than the maximum deflection of the coil core, the resulting movement of the coil core located on the transmission means is approximately linear.

In accordance with a further advantageous embodiment of the invention, the coils associated with a second guide element, together with a capacitor, form a resonant LC circuit. LC resonant circuits are preferably furnished with a device to apply a voltage. Each LC resonant circuit oscillates at a natural frequency that is dependent on the inductivity of the coil and the capacity of the capacitor. If the inductivity of the coil changes because of a change in position of the coil core, this results in a change in the natural frequency. Preferably a DC voltage is applied as the voltage that is sufficient to cause the LC resonant circuit to oscillate freely at its natural frequency.

The dependence of the frequency of an LC resonant circuit on the thickness of a flat object is approximately linear at least in one area. The measurement is preferably carried out in this area. Said area allows the measurement of the thickness with particular sensitivity.

In accordance with a further advantageous embodiment of the invention, the device is equipped with analysis electronics to determine the frequency of the LC resonant circuit. Either separate analysis electronics are provided for each LC resonant circuit, or there is one set of analysis electronics for all LC resonant circuits. In the second case, the analysis electronics have a measurement channel for each LC resonant circuit assigned to each second guide element. This makes it possible to determine the thickness at each of the second guide elements. The analysis electronics are at the same time part of the analysis device.

In accordance with a further advantageous embodiment of the invention, a counter is associated with each LC resonant circuit. The meters count the output signals from the analysis electronics for each LC resonant circuit in a predetermined time interval. This number is transmitted to a memory. Following the time interval, the meters are set to 0, and the next measurement period begins. The frequency of the associated LC resonant circuit is the result of the number of output signals emitted by the analysis electronics in a predetermined time interval. The memories are advantageous so that sufficient time is available to transmit the output signals that were counted over an interface, or to process further the circuit printed on the printed circuit board. There is no need for an ND converter.

In accordance with a further advantageous embodiment of the invention, adjacent coils on the printed circuit board have a predetermined ratio of their natural frequencies without a coil core. How strongly the adjacent coils reciprocally affect each other depends on this ratio. With a specific frequency ratio, even one determined by the spacing of the adjacent coils, the reciprocal affect is negligible. This is advantageous because the position of the core coils exhibits a certain imprecision because of their mechanical structure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
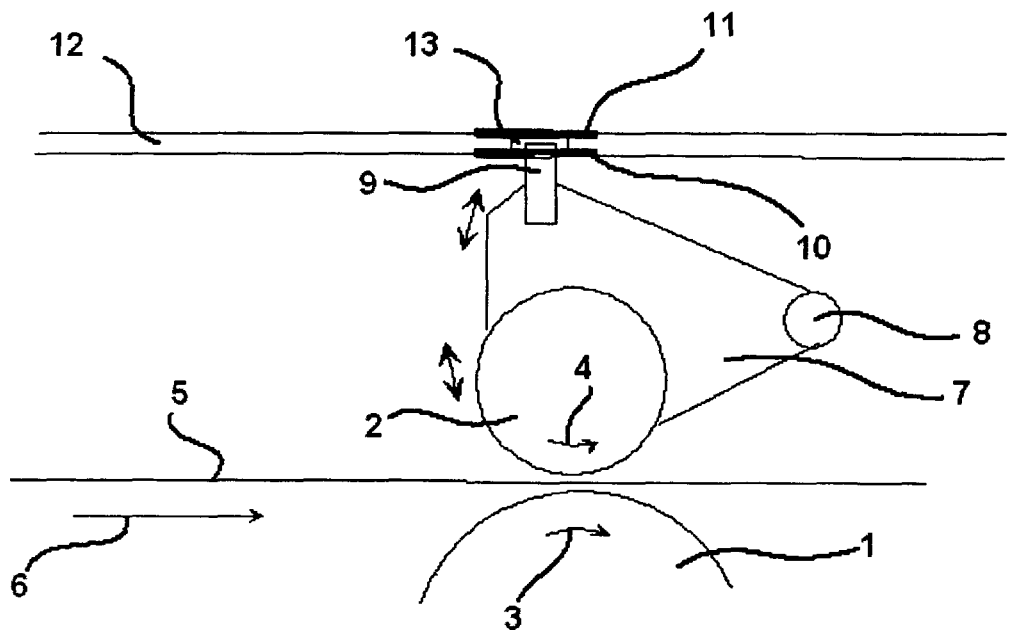
FIG. 1 shows a side view of a device for determining a thickness or thickness variation of a flat object.

The device shown in FIG. 1 has a first guide element 1 and several second guide elements 2. Only one of the second guide elements 2 can be identified in the drawing. The other second guide elements are concealed by the one recognizable in FIG. 1. The first and the second guide elements transport rollers. The transport roller of the first guide element 1 is longer than the individual transport rollers of the second guide elements 2. The total of the length of all second guide elements and of the distances between each two adjacent guide elements equals the length of the first guide element 1. The first guide element 1 and the second guide elements 2 are carried rotatably around different axes. The direction of rotation 3 and 4 of the guide elements is indicated in FIG. 1 by arrows. The first guide element 1 is driven to rotate by a drive not shown in the drawing. As a result of the rotation of the guide elements 1 and 2, a flat object 5, a bank note for example, is transported between the guide elements. The direction of transportation 6 is indicated in FIG. 1 by an arrow. Each of the second guide elements 2 is coupled to a transmission element 7 that is arranged to rotate around an axis of rotation 8. A coil core 9 is furthermore rigidly connected to the transmission element 7. This coil core is configured lengthwise in the shape of a rod. The second end of said rod facing away from the second guide element 2 is carried displaceably in two coils 10 and 11. The two coils are printed on a printed circuit board 12. Both coils 10 and 11 are flat coils. Coil 10 is located on the side of the printed circuit board 12 facing toward the second guide element 2, and coil 11 on the side of printed circuit board 12 facing away from the second guide element. The printed circuit board has an opening 13 for the coil core. The windings of the two coils 10 and 11 enclose this opening. The cross-section of the opening 13 is greater than the cross-section of the coil core. The printed circuit board 12 and the plane in which the two flat coils 10 and 11 are located run parallel to the direction of transportation 6 of the flat object. The printed circuit board 12 with coils 10 and 11 is fixed in location.

All second guide elements 2 are associated with one transmission element 7 with axis of rotation 8 and one coil core 9 in the manner described above. All three parts are rigidly connected to each other. One or two coils surrounding an opening are provided on the printed circuit board 12 fixed in location for each second guide element with transmission element and coil core.

If a flat object 5 is transported through the first and the second guide elements 1 and 2, the second guide elements 2 are deflected upward relative to the first guide element 1. The second guide elements 2 are additionally deflected when the thickness of the flat object changes. Such a variation in thickness can be caused by a piece of adhesive tape applied to the flat object or by a stack containing at least two flat objects. The adhesive tape and the stack are not shown on the drawing. Since adhesive tape does not extend over the entire width of the flat object 5, not all of the second guide elements 2 are additionally deflected by the adhesive tape but only one part thereof. The deflections of the second guide elements 2 result in the transmission element rotating about its axis of rotation. This in turn leads to a deflection of the coil cores 9 upward. The end of the coil cores facing away from the second guide elements is pushed further up into the opening 13 of the printed circuit board and changes its position relative to the two coils 10 and 11. As a result, the inductivity of the two coils changes.

Figure 2:
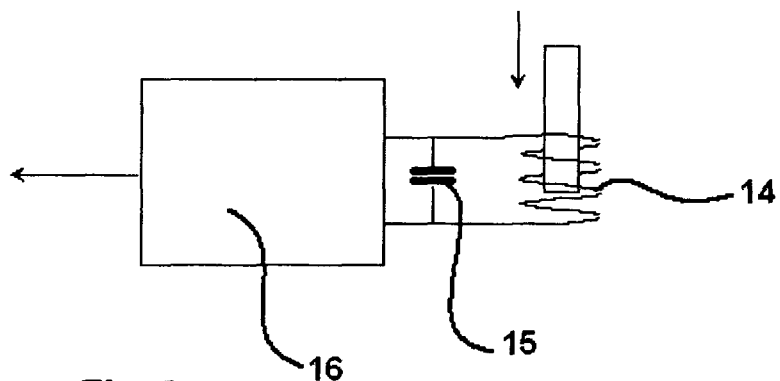
FIG. 2 shows a circuit of an LC resonant circuit of the device from FIG. 1.

FIG. 2 shows a circuit in which the two coils 10 and 11 are symbolized by a coil 14. The inductivity of the coil 14 corresponds to the total of the inductivities of the coils 10 and 11. The coil 14 is attached to a capacitor 15. This is a resonant circuit that is located on the printed circuit board 12. The LC resonant circuit consisting of the coil 14 and the capacitor 15 oscillates at its natural frequency that depends on the inductivity of the coil 14 and the capacity of the capacitor. If the inductivity of the coil 14 changes because of a change of position of the coil core 9 in the coils 10 and 11, this causes a frequency change in the LC resonant circuit. The LC resonant circuit is excited to oscillate at its natural frequency. To do this, a direct current is applied to the LC resonant circuit. Furthermore, analysis electronics 16 are attached to the LC resonant circuit that converts the oscillation of the LC resonant circuit into a square wave signal of the same frequency.

Figure 4:
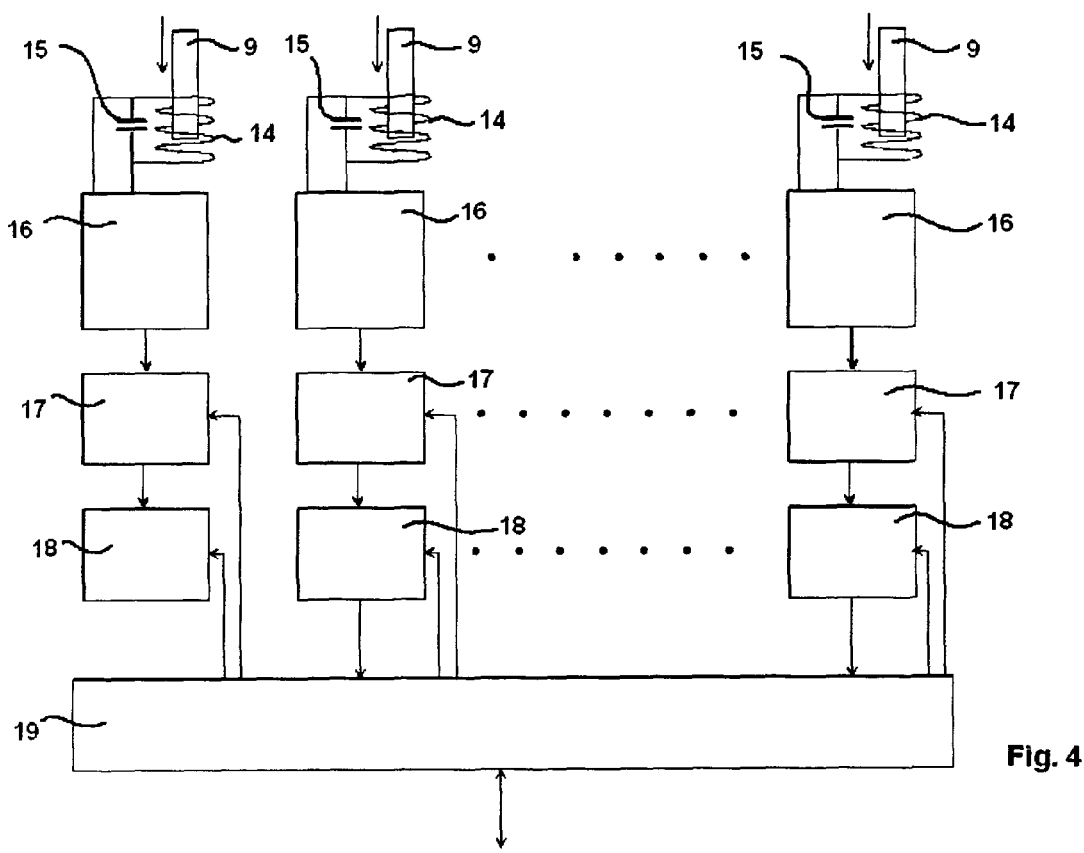
FIG. 4 shows a wiring diagram of several LC resonant circuits with associated analysis electronics from the device from FIG. 1.

In FIG. 4, the LC resonant circuits of several second guide elements 2 are shown. The drawing contains the first, the second and the thirteenth resonant circuit. Resonant circuits three to twelve are indicated by dots. The LC resonant circuits of all second guide elements 2 are constructed as shown in FIG. 2. The square wave signal from the analysis electronics 16 is output to a counter 17. Said counter counts the pulses of the square wave signal within a predetermined time and passes this number on to a memory 18. This number is output by all memories to a control and read-out logic 19 that converts the different numbers into thicknesses and changes in thickness and outputs them over an interface. Analysis electronics, counter, memory and control and readout logic together form the analysis device that determines the influence of the position of the coil cores relative to the coils, identifies from this the thickness of a flat object across its measured width perpendicular to the direction of transportation and outputs said thickness.

Figure 3:
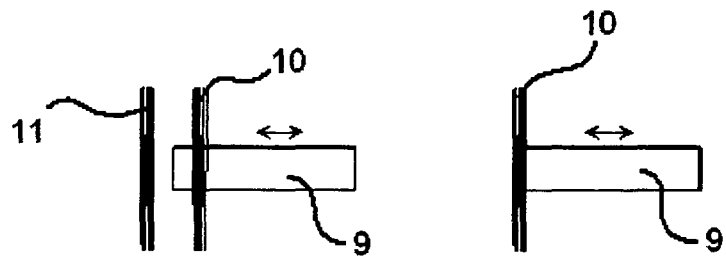
FIG. 3 shows the position of a coil core with respect to two coils and to a coil on the device from FIG. 1.

A coil core 9 with coils 10 and 11 is shown in FIG. 3. Two coils 10 and 11 are shown in the left half of the picture. The two coils are arranged on a printed circuit board 12 as shown in FIG. 1. For simplicity, the printed circuit board is not shown in FIG. 3. The end of the coil core facing away from a second guide element is located between the two coils 10 and 11. This position of the coil core corresponds to the greatest sensitivity of the measurement of thickness. Close to this position, the frequency of the LC resonant circuit is at least approximately a linear function of the thickness or change in thickness. Only one coil 10 with a coil core 9 is shown in the right half of the picture in FIG. 3. For this embodiment, in which only one coil is printed onto the printed circuit board, the range of greatest sensitivity occurs just as the end of the coil core facing away from a second guide element plunges into the coil 10. With a change of thickness that causes a change in position in which the end of the coil core moves in or close to the coil 10, the frequency of the LC resonant circuit is similarly approximately a linear function of the thickness or change in thickness.

In the embodiment shown in the drawing, the LC resonant circuits oscillate at frequencies between 9 MHz and 16 MHz. Measurement time is 1 ms. Only a short time of less than 1 µs is required for the transmission of the measurement results to the memories and starting and stopping the counter, so that practically 1,000 measurements per second and per channel are available. Each combination of analysis electronics, counter and memory assigned to a second guide element corresponds to a channel.

If the coils of several second guide elements are positioned close together, a reciprocal influence of the LC resonant circuits across the magnetic alternating fields is possible in principle. When there are harmonic ratios of the frequencies of adjacent LC resonant circuits on the printed circuit board, the result is superposition of the magnetic fields that results in great jitter. A frequency ratio of about 1.09 between adjacent LC resonant circuits is optimal because with this ratio a large frequency tolerance of about ±2% to ±3% can be allowed.

This tolerance is needed since the position of the coil cores shows a certain imprecision resulting from the tolerance stackup of the mechanical structure.

All features of the invention may be essential to the invention both individually as well as in any combination with each other.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A device for determining a thickness or thickness variation of a flat object in particular a voucher, having at least one first guide element, and having a plurality of second elements disposed adjacent to one another in a row and opposite the first guide element, wherein the flat object can be transported between the first guide element on one side and the second guide elements on the other side, and having a displaceable arrangement of the second guide elements relative to the first guide element in order to bring about a deflection of one or more of the second elements relative to the first guide element in the event of a thickness variation of the flat object running between the guide elements, and having a plurality of coils fixed in location wherein each second guide element is associated with at least one coil, and having at least one coil core rigidly connected to each second guide element and displaceably guided in the coil associated with the second guide element, wherein a deflection of a second guide element brings about a deflection of the associated coil core; a printed circuit board having a plurality of openings, the coils being disposed on the printed circuit board and surrounding the openings; and said coil cores being displaceable relative to the openings in the printed circuit board.

2. The device according to claim 1, wherein each second guide element is associated with two coils and in each case one of the two coils is disposed on the side of the printed circuit board facing toward the second guide elements and the second coil is disposed on the side of the printed circuit board facing away from the second guide elements.

3. The device from according to claim 1, wherein the coil cores have an elongated shape and are disposed with the end facing away from the second guide elements in a non-deflected initial position in or at the opening.

4. The device according to claim 1, wherein the coil core is made of ferrite.

5. The device according to claim 1, wherein the second guide elements and the coil cores are disposed on transmission elements.

6. The device according to claim 5, wherein the transmission elements are disposed so as to be rotatable.

7. The device according to claim 1, wherein the coils associated with a second guide element in each case form an LC resonant circuit together with a capacitor.

8. The device according to claim 7, wherein it is furnished with analysis electronics to determine the frequency of the LC resonant circuits and wherein the analysis electronics are part of the analysis device.

9. The device according to claim 8, wherein each LC resonant circuit is associated with a counter.

10. The device for processing flat objects wherein it is furnished with a device for determining a thickness or thickness variation of a flat object according to claim 1.

11. Apparatus for detecting thickness variations in bank notes comprising:

a conveyor;

a plurality of guide elements located in a row above the conveyor, the plurality of guide elements being configured to be deflected by variations in thickness across the width of the bank notes as they are conveyed past the guide elements;

a circuit board located above and generally parallel to the conveyor, the circuit board having a plurality of openings therein, one opening for each guide element;

at least one coil surrounding each opening in the circuit board;

a plurality of coil cores, one coil core for each guide element;

a plurality of transmission elements, each transmission element being connected to a guide element and its respective coil core, such that deflections in the guide element from variations in the thickness of a bank note cause rotation of the transmission element causing the coil core to be displaced relative to the opening in the circuit board; and analysis circuitry for converting displacements of the coil cores into signals for measuring the variation in thickness of the bank notes, the analysis circuitry having a plurality of adjacent LC resonant circuits, one for each guide element.

12. The apparatus of claim 11 wherein the frequencies of the plurality of LC resonant circuits are substantially harmonic.

* * * * *